(12) United States Patent
Hayes et al.

(10) Patent No.: US 10,474,474 B2
(45) Date of Patent: Nov. 12, 2019

(54) ACTIVATING AN ELECTRONIC DEVICE

(71) Applicant: Cambridge Temperature Concepts Ltd, Cambridge, Cambridgeshire (GB)

(72) Inventors: Jonathan Michael Hayes, Cambridge (GB); Gareth Paul Williams, Cambridge (GB); Shamus Louis Godfrey Husheer, London (GB)

(73) Assignee: Cambridge Temperature Concepts Ltd, Cambridge (GB)

( * ) Notice: Subject to any disclaimer, the term of this patent is extended or adjusted under 35 U.S.C. 154(b) by 105 days.

(21) Appl. No.: 15/520,723

(22) PCT Filed: Oct. 23, 2015

(86) PCT No.: PCT/GB2015/053186
§ 371 (c)(1),
(2) Date: Apr. 20, 2017

(87) PCT Pub. No.: WO2016/063083
PCT Pub. Date: Apr. 28, 2016

(65) Prior Publication Data
US 2017/0315821 A1    Nov. 2, 2017

(30) Foreign Application Priority Data
Oct. 24, 2014  (GB) .................................... 1419024

(51) Int. Cl.
*G06F 1/26* (2006.01)
*G06F 1/32* (2019.01)
(Continued)

(52) U.S. Cl.
CPC .......... *G06F 9/4418* (2013.01); *G06F 1/3206* (2013.01); *G06F 1/3231* (2013.01);
(Continued)

(58) Field of Classification Search
CPC ..................................... G06F 1/26; G06F 1/32
See application file for complete search history.

(56) References Cited

U.S. PATENT DOCUMENTS 6,574,453 B1 * 6/2003 Honda ................. H04B 17/318
455/11.1
8,787,865 B2 * 7/2014 Orr ....................... G06F 1/3203
455/343.1
(Continued)

FOREIGN PATENT DOCUMENTS

| EP | 2733581 | 5/2014 |
|---|---|---|
| WO | WO2015/101568 | 7/2015 |
| WO | WO2016/010857 | 1/2016 |

*Primary Examiner* — Phil K Nguyen
(74) *Attorney, Agent, or Firm* — Occhiuti & Rohlicek LLP

(57) ABSTRACT

An electronic device comprising: a processor having a motion activation mode and an operating mode; an orientation sensor operable to detect the orientation of the device, and a clock configured to, when the processor is in the motion activation mode, periodically power-up the processor; wherein the processor is configured to, when powered-up in its motion activation mode, obtain a measurement of the orientation of the device from the orientation sensor; store the obtained measurement; and process the obtained measurement in dependence on one or more stored measurements of the orientation of the device so as to determine whether the obtained measurement and the one or more stored measurements are indicative of a predetermined sequence of orientations of the device; the processor being configured to transition from its motion activation mode to its operating mode in response to determining that the obtained measurement and the one or more stored measurements are indicative of the predetermined sequence of orientations of the device.

20 Claims, 4 Drawing Sheets

(51) Int. Cl.
  *G06F 9/4401* (2018.01)
  *G06F 1/3206* (2019.01)
  *G06F 1/3287* (2019.01)
  *G06F 3/01* (2006.01)
  *H04W 52/02* (2009.01)
  *G06F 1/3231* (2019.01)
  *G06F 1/3296* (2019.01)

(52) U.S. Cl.
  CPC .......... *G06F 1/3287* (2013.01); *G06F 1/3296* (2013.01); *G06F 3/017* (2013.01); *H04W 52/0254* (2013.01); *G06F 1/26* (2013.01); *Y02D 10/171* (2018.01); *Y02D 70/00* (2018.01); *Y02D 70/142* (2018.01); *Y02D 70/144* (2018.01); *Y02D 70/162* (2018.01); *Y02D 70/21* (2018.01); *Y02D 70/26* (2018.01)

(56) References Cited

U.S. PATENT DOCUMENTS

| | | | |
|---|---|---|---|
| 2004/0181703 A1* | 9/2004 | Lilja | H02J 9/005 713/324 |
| 2005/0188583 A1* | 9/2005 | Jackson | F41A 17/06 42/70.11 |
| 2005/0212759 A1* | 9/2005 | Marvit | G06F 1/1613 345/156 |
| 2005/0222801 A1 | 10/2005 | Wulff et al. | |
| 2006/0240866 A1 | 10/2006 | Eilts | |
| 2007/0288779 A1* | 12/2007 | Kim | G06F 1/3203 713/320 |
| 2008/0047363 A1* | 2/2008 | Arms | B60C 23/0411 73/862 |
| 2008/0229255 A1 | 9/2008 | Linjama et al. | |
| 2009/0195497 A1 | 8/2009 | Fitzgerald et al. | |
| 2010/0134308 A1 | 6/2010 | Barnardo et al. | |
| 2010/0235667 A1* | 9/2010 | Mucignat | G06F 1/3203 713/323 |
| 2010/0306711 A1* | 12/2010 | Kahn | G06F 3/017 715/863 |
| 2012/0062454 A1* | 3/2012 | Takahashi | G06F 3/0304 345/156 |
| 2012/0302163 A1* | 11/2012 | Kitchen | H04B 5/00 455/41.1 |
| 2013/0060515 A1 | 2/2013 | Wei et al. | |
| 2014/0013141 A1* | 1/2014 | Heo | G06F 1/3293 713/323 |
| 2014/0351560 A1* | 11/2014 | Lautner | G06F 3/0346 712/30 |
| 2015/0043411 A1* | 2/2015 | Kim | H04W 4/70 370/311 |
| 2015/0142441 A1* | 5/2015 | Kim | G10L 17/00 704/249 |

* cited by examiner

ACTIVATING AN ELECTRONIC DEVICE

This invention relates to an electronic device comprising a processor having a motion-activation mode and an operating mode.

There is an increasing need for relatively simple, low-cost electronic devices. For example, there is increasing interest in the field of wearable sensing devices, for sports or healthcare purposes. Such wearable sensing devices may comprise the main 'wearable item', e.g. a bracelet, strap etc., and an electronic sensing device which can fit into or be held by the wearable item. A typical sensing device may comprise a sensor for measuring certain parameters, a wireless transceiver for transmitting measured data, and a processor unit for executing instructions to control the operation of the sensor and transceiver. The sensing device would also require a power unit such as a battery in order to power the device.

In the field of low-cost electrical devices, it is often the case that the devices are manufactured with the power source pre-installed. The devices may even be designed to be disposable so that when the power source is depleted of energy, the device is simply thrown away. In these situations, it is desirable for the usable lifetime of the power source to be extended as long as possible.

One problem that may occur is the indeterminate time between the device's manufacture and the acquisition of the device by an end user. If this is time is long in duration it could significantly eat into the useful lifetime of the power source and hence the electronic device itself. It could also introduce an uncertainty into the expected lifetime of a device as different batches of devices may be held in storage prior to sale for differing lengths of time. This may be frustrating for an end user of the device and may reflect poorly on the perceived quality of the device. There is therefore a need for an improved electronic device with an increased useable lifetime.

According to the present invention there is provided an electronic device comprising:
  a processor having a motion activation mode and an operating mode;
  an orientation sensor operable to detect the orientation of the device, and
  a clock configured to, when the processor is in the motion activation mode, periodically power-up the processor;
  wherein the processor is configured to, when powered-up in its motion activation mode, obtain a measurement of the orientation of the device from the orientation sensor; store the obtained measurement; and process the obtained measurement in dependence on one or more stored measurements of the orientation of the device so as to determine whether the obtained measurement and the one or more stored measurements are indicative of a predetermined sequence of orientations of the device;
  the processor being configured to transition from its motion activation mode to its operating mode in response to determining that the obtained measurement and the one or more stored measurements are indicative of the predetermined sequence of orientations of the device.

The processor may be configured to power-down immediately on completing the said processing in response to determining that the obtained measurement and the one or more stored measurements are not indicative of a predetermined sequence of orientations of the device.

The clock may be configured to causes the processor to power up at a frequency of no more than 2 Hz and preferably no more than 1 Hz.

In its motion-activated mode, the processor may be in a low power mode.

The processor may be configured to process the measurements from the orientation sensor by comparing the obtained measurement and the said one or more stored measurements against a stored sequence of measurements indicative of the predetermined sequence of orientations of the device, the processor identifying said predetermined sequence on determining a match within predefined bounds between the obtained and said one or more stored measurements and the stored sequence of measurements.

The predetermined sequence of orientations of the device may comprise at least two orientations.

The predetermined sequence of orientations of the device may comprise three orientations, the first and second orientations of the sequence being different orientations of the device.

The first and third orientations of the sequence may be substantially the same orientation of the device.

The first and third orientations of the sequence may be different orientations of the device.

The first and second orientations may differ by approximately ninety degrees.

The first and second orientations may differ by approximately one hundred and eighty degrees.

The orientation sensor may be configured to be substantially powered-down between each measurement of the orientation of the device, when the processor is in its motion-activated mode.

The electronic device may further comprise a wireless transceiver and the processor is operable to communicate using the wireless transceiver when in its operating mode and to inactivate the transceiver when in its motion-activated mode.

The processor may be operable to, on entering its operating mode, use the wireless transceiver to communicate messages for establishing a connection with a remote device.

The electronic device may be further configured to enter its motion-activated mode if no such connection is established within a predetermined time period.

The wireless transceiver may operate according to at least one of the following communications protocols: Bluetooth, IEEE 802.11, IEE 802.15, ANT+.

The electronic device may be adapted for measuring a parameter of its environment, and the device is configured to measure said parameter only when the processor is in its operating mode.

The processor may be configured to transmit data indicative of the measured parameter via the wireless transceiver only in its operating mode.

The electronic device may comprise a power source for powering the electronic device but does not present any means for charging the power source.

The electronic device may comprise a non-replaceable power source for powering the electronic device.

The electronic device may be wholly encapsulated within a sealed casing.

The electronic device may not presenting any input means to a user.

The motion sensor may comprise one or more accelerometers.

The clock may form part of the processor.

The clock may form part of the orientation sensor.

The processor and orientation sensor may form a single integrated device.

The processor, orientation sensor and clock may form a single integrated device.

According to a second aspect of the present invention there is provided a method of activating an electronic device comprising a processor having a motion-activation mode and an operating mode, an orientation sensor operable to detect the orientation of the device, and a clock configured to, when the processor is in motion-activation mode, periodically power up the processor, wherein the processor is configured to, when powered-up in its motion activation mode, obtain a measurement of the orientation of the device from the orientation sensor; store the obtained measurement; and process the obtained measurement in dependence on one or more stored measurements of the orientation of the device so as to determine whether the obtained measurement and the one or more stored measurements are indicative of a predetermined sequence of orientations of the device, the method comprising:

providing instructions to a user to perform a predetermined sequence of orientations of the device;

when the processor is in motion-activated mode, performing the predetermined sequence of orientations of the device substantially as instructed;

the processor obtaining a plurality of measurements of the orientation of the device from the orientation sensor and processing those measurements to identify the performed predetermined sequence of orientations of the device; and causing the processor to transition from the motion-activated mode to the operating mode.

The instructions may instruct the user to perform the sequence at a defined rate.

The present invention will now be described by way of example with reference to the accompanying drawings. In the drawings.

Figure 1:
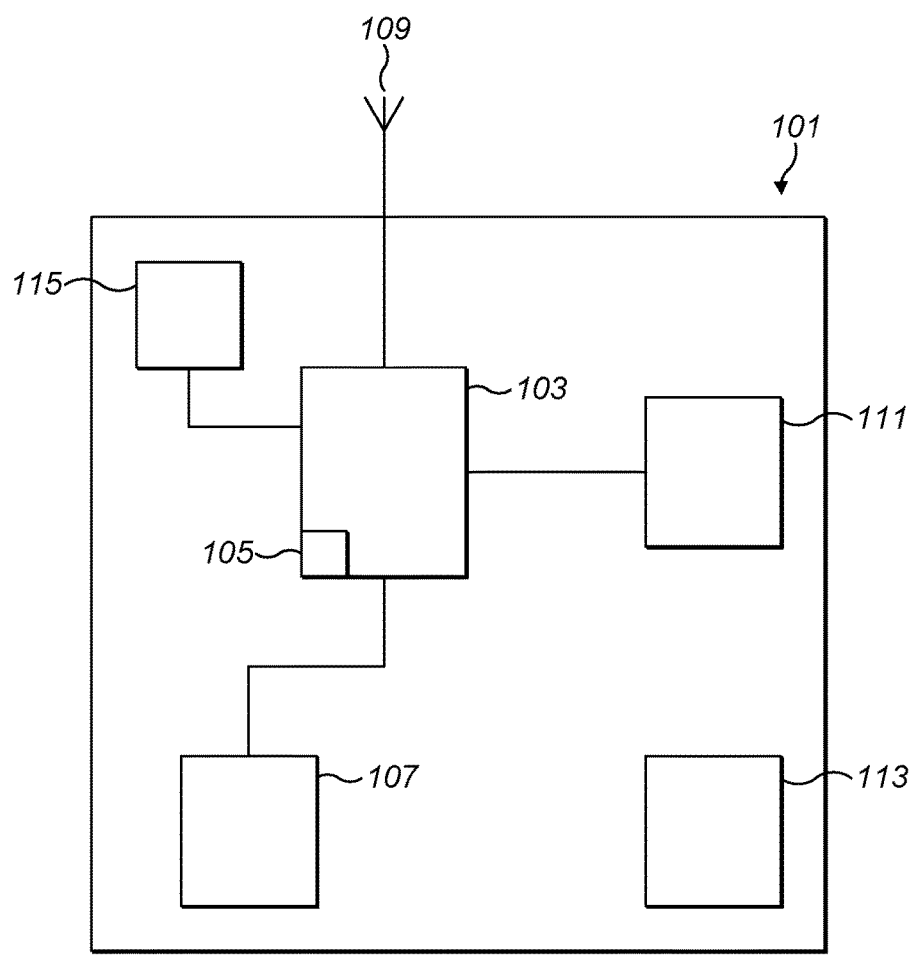
FIG. 1 shows a schematic illustration of an electronic device comprising a processor configured to have a motion-activation mode and an operating mode.

The present disclosure describes an electronic device comprising a processor with a motion-activation mode and an operating mode. When the processor is in motion-activation mode it may consume less power when than in the operating mode. The electronic device comprises an orientation processor which is configured to obtain measurements indicative of orientation of the electronic device. The device may further comprise a clock that periodically causes the processor to power-up when in the motion-activation mode. When the processor is powered-up, it obtains a measurement from the orientation sensor, stores the measurement, and processes the measurement in dependence on one or more stored measurements of the orientation of the device so as to determine whether the obtained measurement and the one or more stored measurements are indicative of a predetermined sequence of orientations of the device. If the processor determines that the obtained measurement and the one or more stored measurements are indicative of the predetermined sequence of orientations of the device, the processor transitions from its motion activation mode to its operating mode.

The processor may poll the orientation sensor for the measurement. The orientation sensor may be configured to be powered-down, or turned off, between measurements when the processor is in the motion-activation mode. By only powering-up the orientation sensor periodically to obtain a measurement, the orientation of the device may be monitored by consuming very little power. In order to transition through its predetermined sequence of orientations, the device is rotated or translated in space (e.g. by a user performing a series of movements according to a set of instructions provided with the device).

This may be particularly advantageous for devices which are disposable in the sense that they are designed to be discarded once the power source of the device is depleted. A class of such disposable devices could be devices which are distributed from manufacture and purchased with a battery pre-installed.

A device may be designed as a disposable device because the device does not present any means for charging the power source of the device, such as for example: inductive charging; magnetic charging; charging via a connection to an electrical power supply; solar charging (e.g. using photovoltaic cells) etc.

Alternatively or in addition, the device may be designed as a disposable device by sealing the battery within the device so as to be inaccessible by a user during normal use, meaning it cannot be readily replaced once depleted. One way of sealing the battery within the device could be for the device to comprise a sealed casing which wholly encapsulates the battery and other components of the device, such as the motion IC and the device processor. In this way the electronic device presents no way for a user to replace the battery.

Electronic devices with pre-installed batteries can suffer from the problem that the device consumes large amounts of power before being put to its intended use, for example whilst the device is being shipped or during storage prior to sale. One way to reduce the power consumption of such devices is to configure the processor of the device to have a motion-activation mode (e.g. for use in shipping and storage) and an operating mode for when the device is to be put to its intended use. By only placing the device into the higher-power operating mode when the device is to be used, the usable lifetime of the device may be extended. If the battery is sealed within the device, the user needs to be able to activate the device without direct access to the battery. The device may further be configured so as to not provide any input means to a user, for example a graphical user interface or operational buttons, switches etc.

One approach to activate such devices is to configure the processor to be activated in the presence of a magnetic field of predetermined strength. However, this approach suffers from the drawback that the device may be activated accidentally relatively easily, for example if the device is placed near a magnetic material during transportation or storage. In addition, the activation of such a device requires the user to have a magnet, which places an additional requirement on the user. Another approach is to use a removable pin or insulating tab that, when present in the device, separates the terminals of the power source from the power source so that no power is consumed. When the user receives the device, the pin or tab can be removed to cause the terminals to engage with the power source, thereby powering the device. However, a problem with this approach is that the pin or tab has to be accessible and so the device electronics cannot be entirely sealed from the environment. This can make it difficult to provide a fully waterproof device.

According to the present disclosure, the processor can transition from a motion-activation mode to an operating mode upon identifying a predetermined sequence of orientations of the device. The device may be manipulated through the predetermined sequence of orientations by a user. By moving the device through a predetermined sequence of orientation in order to activate the processor, the processor is less likely to suffer from accidental activations. It also presents an intuitive, user-friendly approach to activating the processor to an operating mode.

Activating the processor of the electronic device from the motion-activating mode therefore requires that the user manipulate the position of the electronic device at a rate commensurate with the timing of the measurements obtained from the orientation sensor so that the obtained measurements are indicative of the sequence of orientations of the device required for activation. The requirement that the device be moved through a predetermined sequence of orientations at a predefined rate in order to be activated can help to keep the rate of accidental activations low: for example, through careful choice of the orientations and rate, it can be made extremely unlikely that during transportation and storage of the device prior to acquisition by a user. Generally, the more components comprised in the predetermined sequence of movement there are, the lower the rate of false activations will be.

Furthermore, by using a clock to periodically power-up the processor, and only obtaining a measurement from the orientation sensor when the processor is powered-up, the processor can be maintained in the motion-activated mode for a long periods of time whilst consuming very little power. For example, the orientation sensor can be configured to be powered down, or enter a sleep mode, in between measurements when the processor is in the motion-activated mode. This offers power-saving advantages compared to devices in which the orientation sensor is maintained in a powered-up state. This makes the electronic device suitable as a disposable device, for example a device that presents no way for the user to replace or recharge the power source.

FIG. 1 is a schematic diagram of an electronic device according to an embodiment of the present disclosure. The device 101 comprises a processor 103, a clock 105, a non-volatile memory 115, an orientation sensor 107, a transceiver 109, a parameter sensor 111 and a battery 113. The battery 113 powers the other components of the electronic device.

The electronic device 101 may be configured to be a wearable device, for example by being attachable to a user's skin by an adhesive or via a wearable item. Alternatively, the electronic device may be a configured to be part of a device for use in machine-to-machine (M2M) communications. The electronic device may be configured so as to be disposable in the sense that once the battery 113 is depleted of its resources, the device is to be discarded. The battery may be concealed within the electronic device during manufacture so as to be inaccessible by a user of the device. For example, the device may comprise a sealed casing that wholly encapsulates the battery, the motion sensor and the device processor. The device may be wholly encapsulated. Alternatively or in addition, the device may be configured so as to not present any means for charging or replacing the battery, for example inductive charging; magnetic charging; charging via a connection to an electrical power supply; solar charging (e.g. using photovoltaic cells) etc. These implementations may be suitable if the electronic device were a low-cost device.

The device may be a 'simple' electronic device in that it does not provide any input means or present a user interface to the user. For example, the device may not comprise a graphical user interface, or any operational buttons, switches etc. Such a configuration may be suitable for low-cost, disposable devices.

The orientation sensor 107 is configured to obtain a measurement of the orientation of the device. The orientation sensor could for example be an accelerometer. The accelerometer could be a digital accelerometer or an analogue accelerometer. Although only one orientation sensor is shown in FIG. 1, it will be appreciated that in all the embodiments described herein the electronic device may comprise two or more orientation sensors. For example the device may comprise three orientation sensors so as to measure the orientation of the device with respect to three axes.

The processor 103 is configured to have a motion activation mode and an operating mode. When the processor is in the motion activation mode the processor is periodically powered-up by the clock 105. The processor may be powered up at a frequency of about 1 Hz. When the processor is powered up in the motion activation mode, the processor obtains a measurement of the orientation of the device from the orientation sensor 107. In one example the processor polls the orientation sensor for a measurement on the device's orientation. The processor may store the measurement obtained from the orientation sensor in a memory. This may be a local memory to the processor or an external memory, such as memory 115. The processor then processes the obtained measurement with at least one or more stored measurements previously obtained from the orientation sensor to determine whether the obtained measurement and the one or more stored measurements are indicative of a predetermined sequence of orientations of the device. If the processor determines that the obtained measurement and the one or more stored measurements are indicative of the device being moved through a predetermined sequence of orientations, the processor transitions from the motion activation mode to the operating mode. The processor may power-up, or activate the orientation sensor in order to obtain a measurement. In this way the orientation sensor can be powered-down, or turned off, in the time between measurements. Using the processor to activate or turn on the orientation sensor only when a measurement is required can result in a reduction in power consumption compared to methods in which the orientation sensor is maintained in an active, or 'on' state, even if this state is a low-powered state.

When the processor is in operating mode it may power-up other components of the electronic device such as the parameter sensor 111 and the transceiver 109. These components would be powered-down when the processor is in the motion-activation mode.

The sensor 111 may be a sensor for measuring a parameter of the environment of the electronic device. For example, the sensor may be a temperature sensor, a pressure sensor, a humidity sensor, sound sensor etc. Alternatively, the sensor may be configured for measuring parameters of a user of the device, for example blood pressure, heart rate a user's skin or body temperature and so on. Although only one parameter sensor 111 is shown in FIG. 1, it will be appreciated that the electronic device may alternatively comprise more than one sensor for measuring different parameters, or multiple sensors for measuring the same parameter.

When the processor 103 is in operating mode it may cause data indicative of the parameter measured by the sensor 111 to be stored in memory 105, either directly or after having being processed by the processor. For example, if the sensor is an analogue sensor and provides an analogue output, the processor may digitally convert the output from the sensor to digital data before storing in memory 105.

The transceiver 109 may be a short-range transceiver. It could, for example, operate according to a communications protocol such as Bluetooth, IEEE 802.11 (Wi-Fi), IEEE 802.15 (Zigbee) or ANT. The transceiver can operate under the control of the processor when in operating mode to transmit data that has been stored in memory to another device, such a as a smartphone or a computer.

In the example embodiment shown in FIG. 1, the processor 103 also functions as the central processor of the electronic device. That is, when the processor is in operating mode the functionality of the other components of the electronic device are controlled by the processor. It will be appreciated however that in all the embodiments described herein, the electronic device may comprise a motion processor for periodically polling the orientation sensor in response to being powered up by the clock, and a separate central processor. In this case the central processor would be powered down when the motion processor is in motion activation mode and would be powered-up by the motion processor when the motion processor transitioned to its operating mode in response to identifying that the device had been moved through a predetermined sequence of orientations.

Alternatively, the processor 103 may be embedded within the orientation sensor. The processor and orientation sensor may be in the form of a motion IC. In this embodiment the processor may be embedded as a state machine.

Although the clock 105 is shown as being part of the processor 103, it will be understood that this is for the purposes of illustration only. For example the clock may be a separate component connected to the processor, or it may be included as part of the orientation sensor. Alternatively still, the processor 103, clock 105 and orientation sensor 107 may all be elements of a single integrated device.

In the embodiments described herein, the motion IC may be for example the LIS3DSH accelerometer which contains an embedded state machine. The orientation sensor may be, for example, the LIS3DSH or LIS3DH accelerometer. The processor may be a PIC16F684.

Figure 2:
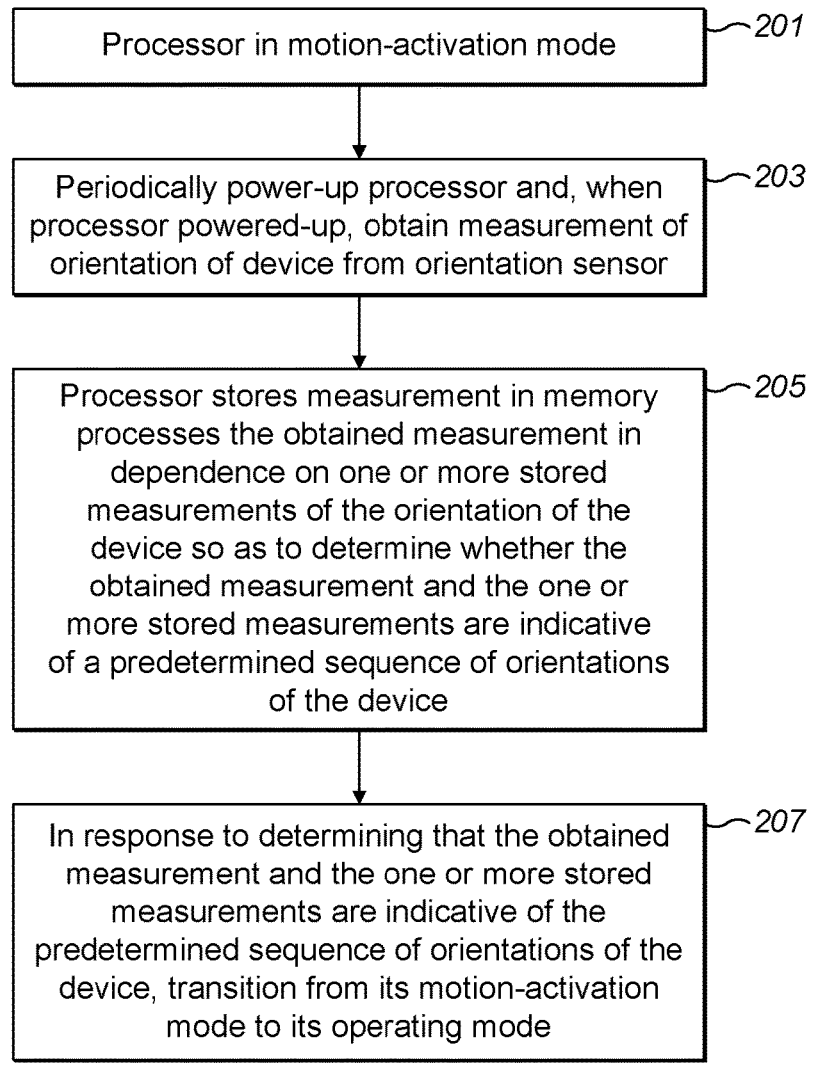
FIG. 2 is a flowchart of the steps for causing the processor to transition from the motion-activation mode to the operating mode.

A flow-chart of the steps performed when the processor transitions from a motion-activation mode to an operating mode are shown in FIG. 2. This example id described with reference to the electronic device illustrated in FIG. 1, however it will be appreciated that it applies equally to the alternative embodiments of the electronic device.

In step 201 the processor of the electronic device is in the motion-activation mode. The motion activation mode may be a mode in which the device is not operating according to its full functionality. For example, when the device 101 is in the motion-activation mode, sensor 111 and transceiver 109 may be powered-down and inactivated.

When the processor is in the motion-activation mode, the clock is configured to periodically power-up the processor. In between times when the processor is powered-up, it may be powered-down. When the processor is powered up in motion-activation mode it obtains a measurement of the orientation of the device from the orientation sensor (step 203).

To do this the processor may poll the orientation sensor. The processor may activate, or power-up the orientation sensor in order to obtain the measurement. This may enable the orientation sensor to be powered down, or turned off, when the processor is in the motion-activation mode at times except for when it is polled by the processor. This may advantageously reduce the power consumption required to monitor the orientation of the device compared to methods in which the orientation sensor is maintained in a 'low-power' active state.

For example, the LIS3DSH accelerometer has an average power consumption of 11 micro Amps when in an 'active' state in which it measures the orientation of the device. The LIS3DH accelerometer has a power consumption of the order of 2 micro Amps. However the inventors have found that by periodically powering up a PIC16F684 processor to periodically poll the accelerometer at a rate of approximately 1 Hz, the average power consumption of the processor and accelerometer is around 0.5 micro Amps total (300 micro Amps of power are consumed between the processor and the accelerometer when the processor is powered-up for a duration of 1 ms. A suitably low-powered clock, such as the Ultra-Low Power Wake Up module for the PIC16F684 consumes 0.2 micro Amps for periodic power-ups. Thus at a power-up frequency of 1 Hz, the average total power consumption is 0.2 micro Amps+0.3 micro Amps=0.5 micro Amps). Thus the orientation of the device can be monitored during the motion-activation mode at an average rate of 0.5 micro Amps, which is below that obtained by maintaining the accelerometer in an active state.

At step 205 the processor stores the measurement in memory and processes the obtained measurement in dependence on one or more stored measurements of the orientation of the device so as to determine whether the obtained measurement and the one or more stored measurements are indicative of a predetermined sequence of orientations of the device. The processor may do this by comparing the obtained measurement and stored measurements against a stored sequence of measurements indicative of the predetermined sequence of orientations of the device. If the processor can determine a match within predefined bounds of a sequence of consecutive measurements obtained from the orientation sensor with its stored sequence of measurements, it can determine that the electronic device has been moved through the predetermined sequence of movement, or orientation.

In response to determining that the obtained measurement and the one or more stored measurements are indicative of the predetermined sequence of orientations of the device, the processor is configured to transition from its motion-activation mode to its operating mode (step 207).

When the processor is in the operating mode the electronic device may be capable of utilising its full functionality. For example, when in the processor is in the operating mode it may activate the transceiver 109 and communicate messages by transmission and reception via the transceiver. The device may do this by first entering an 'advertising mode' in which it communicates messages according to its communication protocol in an attempt to connect to remote devices. The device may further obtain measurements from its sensor 111 when in the operating mode under the control of the processor (the sensor 111 being deactivated when the processor is in the motion-activation mode). Data indicative of these measurements may then be transmitted from the device using the transceiver 109, for example to remote devices that the device 101 connected to through the 'advertising mode'.

In one example sensor 111 may be a temperature sensor for measuring body temperature. The device may have more than one temperature sensor. When the device processor is in the motion-activation mode, the temperature sensor may be powered down. When the device processor is in operating mode, the temperature sensor may be activated. The temperature sensor may be configured to obtain measurements of a user's temperature under the control of the processor. In one example, the temperature sensor is suitable for measuring the user's temperature whilst they are sleeping.

The device processor may obtain measurements using both the temperature sensor and the orientation sensor 107 in combination. In this example the orientation sensor would obtain measurements of the device's orientation when the processor is in operating mode, as well as when it is in motion-activated mode. The rate at which the orientation sensor is polled for measurements may suitably be higher when the processor is in operating mode compared to when it is in motion-activated mode. In one example implementation, the electronic device may be wearable by a user when the user is sleeping. The orientation sensor could then be used to obtain measurements of the person's movement during their sleep. This information could be collected in tandem with the user's body temperature obtained from the temperature sensor. Information on a person's sleep movement and body temperature may be useful for a variety of purposes. For example it may be used to deduce a person's basal body temperature, or their quality of sleep.

Information collected from the temperature sensor and/or the orientation sensor can be communicated by the transceiver 109 under the control of the processor to a remote device, for example a user's smartphone, laptop, PDA etc. Alternatively it may be communicated to a central server for professional medical analysis. By communicating collected information to a remote device for analysis, the electronic device may advantageously remain a low-powered, sealed, and/or disposable device. Some non-limiting examples of uses to which data derived from the sensor 111 may be put are assisting natural conception, natural contraception, artificial insemination, in-vitro fertilisation (IVF), detecting or predicting ovulation, skin care, assisting post-operative recovery and diagnosis, assisting weight management, baby monitoring, monitoring sports performance, monitoring performance in extreme environments, tamper evidence, wearer tracking, in-hospital monitoring of bodily functions, assisting fitness, health, wellbeing or activity management, and detection, diagnosis, treatment, management or background monitoring for of any of the following conditions: chronic obstructive pulmonary disease (COPD), cystic fibrosis (CF), diabetes, hypoglycaemia, sleep disturbance, sleep apnoea, chronic pain, infection (e.g. by bacterial, viral, prion, protozoal, fungal or parasitic agents), sepsis, polycystic ovary syndrome (PCOS), menopause, asthma, insomnia, schizophrenia, coronary heart disease, narcolepsy, restless legs syndrome. The sensor and the electronic device may be applied to humans or animals.

The processor may be configured to power-down and re-enter the motion-activation mode if it cannot connect to a remote device within a certain predetermined time period. For example, if the device enters the 'advertising mode' and cannot connect to a remote device within approximately two minutes of entering the operating mode, the processor may deactivate the transceiver 109 and enter the lower-power motion-activated mode. Of course, this time period is configurable and implementation specific. This may advantageously minimise power consumption in the event the device is accidentally activated.

In one embodiment the motion sensor is an accelerometer, for example either a single, dual or tri-axis accelerometer.

The accelerometer may be configured to obtain measurements corresponding to the orientation of the device. For example, a single-axis accelerometer aligned along the direction of the earth's gravitational field will output a measurement of approximately −1 g in one orientation and approximately +1 g when aligned with the gravitational field but in the opposite orientation. A series of measurements from an accelerometer corresponding to the orientation of the device can therefore be indicative of the movement of the device: continuing our example above, a series of measurements reading −1 g, +1 g indicates that between those measurements the device has been rotated through approximately 180 degrees. It can readily be seen that if the accelerometer is a dual or tri-axis accelerometer, the predetermined sequence of movements may comprise movements about two or three perpendicular axes respectively.

Thus the orientation sensor may be used within an electronic device to cause the processor of the device to transition from a lower-powered motion-activation mode to a higher powered operating mode when the device is moved through a predetermined sequence of orientations. Thus a device may be activated without requiring any interaction with a user beyond the user orienting the device. This may be particularly advantageous for electronic devices of the type discussed above which may not provide an interface for interaction with a user, for example because the device is sealed, or wholly encapsulated within a casing.

The predefined frequency at which the processor is periodically powered-up by the clock can be entirely implementation specific. In one example, the clock causes the processor to power-up at a frequency of no more than 2 Hz and preferably no more than 1 Hz. In alternative embodiments, this frequency may be higher or lower. It can be seen that decreasing the frequency at which the processor is powered up will result in lower power consumption at the expense that moving the device through the predetermined sequence of orientations will take a user longer to perform.

Figure 3:
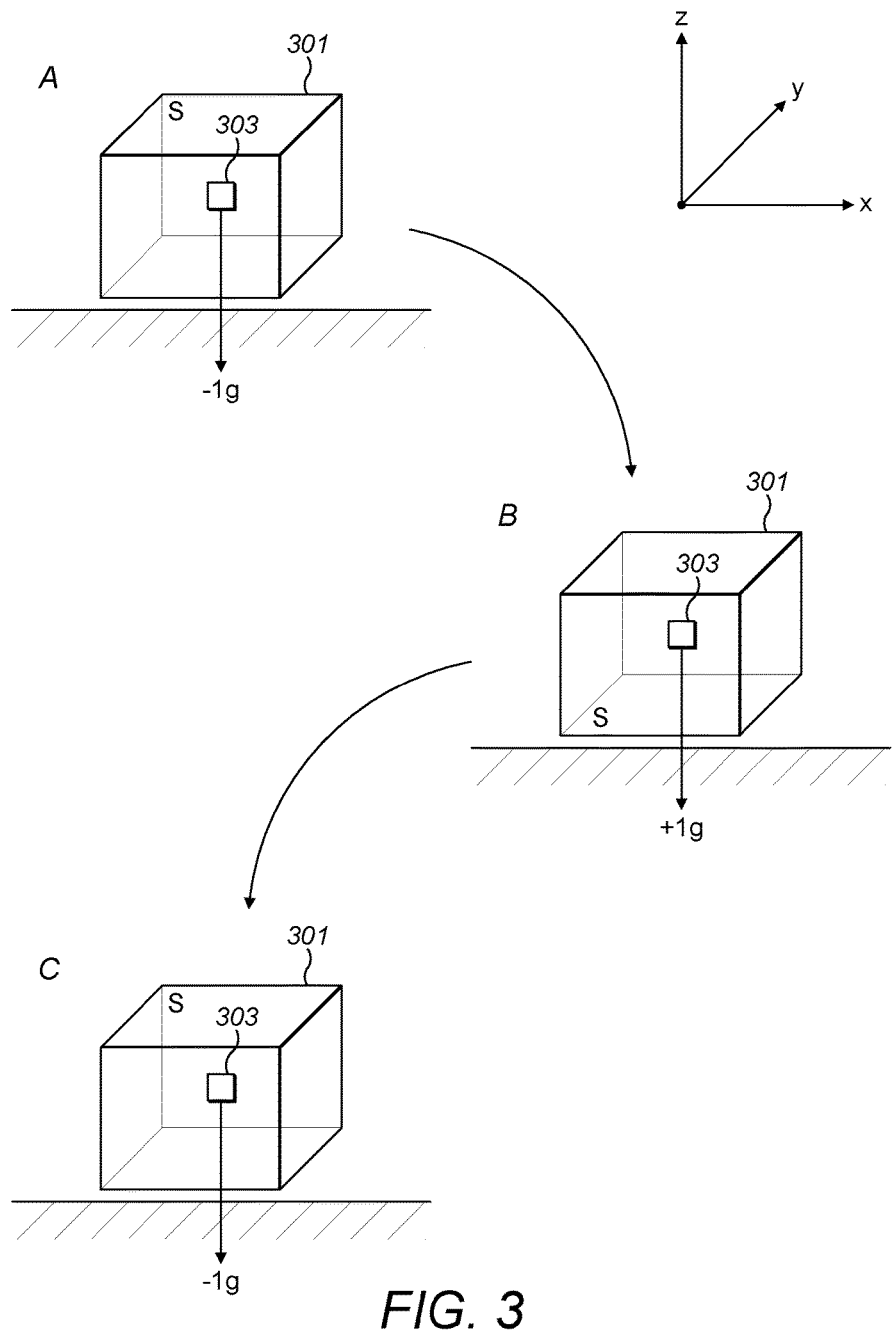
FIG. 3 shows an example of a sequence of movements for causing a processor of an electronic device to transition from the motion activation mode to the operating mode

FIG. 3 illustrates an example of a predetermined sequence of orientations for causing a processor to transition to an operating mode from a motion-activation mode.

Shown in FIG. 3 is a schematic of an electronic device 301. The device comprises an orientation sensor in the form of a single axis accelerometer 303 configured to obtain measurements indicative of movement of the device. Other components of the electronic device have been omitted for the purposes of clarity. A coordinate system is shown for the purposes of providing a reference when discussing the orientation of the device. For similar reasons, a single surface 'S' of the device has been labelled. For this example the coordinate system is orientated so that the positive z-direction extends away from the ground and the negative z-direction extends in the direction of the ground. With reference to this coordinate system, the single axis accelerometer is a z-axis accelerometer.

The device 301 comprises a processor (not shown) configured to have a motion-activation mode and an operating mode. The processor transitions from its motion-activation mode to its operating mode in response to determining that the obtained measurement and the one or more stored measurements are indicative of the predetermined sequence of orientations of the device. In this example, the predetermined sequence of measurements comprises three measurements. It will be understood that this is for the purposes of illustration only and that the sequence of measurements may comprises any number of measurements, though preferably the number of measurements in the sequence is at least three so as to minimise accidental activation of the device.

The first measurement of the sequence is a reading of approximately −1 g. This corresponds to the device being in an orientation A, in which the accelerometer is sitting on its back and approximately parallel to the ground.

The second measurement of the sequence is a reading of approximately +1 g, which corresponds to the accelerometer sitting on its front and the device being in an orientation B, in which the device is inverted along z-axis relative to orientation A.

The third measurement of the sequence is a reading of approximately −1 g, which corresponds to the device being in an orientation C substantially similar to (or equal to) orientation A.

A user wanting to activate device 301 would therefore perform a sequence of movements beginning by holding (or placing) the device in orientation A; moving the device from orientation A to orientation B; and then moving the device from orientation B to orientation C, which is at least substantially similar to orientation A.

The orientation sensor may be configured to make use of a tolerance in the measurements when identifying if the device has been moved through the correct sequence of movement. One way the orientation sensor may do this would be to take the device to be in a certain orientation if the value of the measurement is greater than a threshold, e.g. if the measurement is greater than +0.7 g, the orientation sensor takes the device to be in orientation B. This may make the sequence of movement more user friendly to perform by requiring less accuracy on the part of the user.

It will be appreciated that the sequence of orientations illustrated in FIG. 3 is merely an example and that any suitable sequence of orientations could be used to cause a processor to transition from a motion-activated mode to an operating mode. For example, instead of the sequence of measurements from the orientation sensor reading +1 g, −1 g, +1 g; the sequence could read −1 g, +1 g, −1 g. Alternatively, the sequence of measurements indicative of the predetermined sequence of orientations could comprise more than three measurements. Having more than three measurements may have the advantage of reducing the false-positive rate of accidental activations since it is less likely for a device to be accidently moved through a longer sequence of orientations. Alternatively still, the predetermined sequence of movements may contain movements in multiple directional planes (for instance if the orientation sensor is a dual or tri-axis accelerometer). As an example, a predetermined sequence of orientations may comprise moving the device from orientation A to orientation B as shown in FIG. 3, and then moving the device to a third orientation perpendicular to both orientation A and orientation B. In one embodiment, successive orientations differ by approximately 90 degrees, or approximately 180 degrees, or a mixture of the two for a particular predetermined sequence.

In order for the orientation sensor to measure the correct measurements corresponding to the sequence of orientations required to activate the device, it is necessary for the device to be in the correct orientation at the time the orientation sensor obtains its measurement. This itself requires the user to control the movement of the device approximately synchronously with the timing of the measurements by the orientation sensor. For example, if the orientation sensor measures the orientation of the device every four seconds, the user holding the device in the corresponding orientation for a period of time slightly greater than this, say for about five seconds, before moving the device to the next orientation would likely ensure that the device is in the correct orientation at the time of each measurement. If the user performs the sequence of movements too quickly or too slowly, the orientation sensor will not be able to identify the predetermined sequence of orientations from the measurements it receives, even if the device has indeed been moved through the required sequence of orientations.

To assist the user in performing the sequence of orientations correctly, a demonstration may be presented to a user on a device, for example a smartphone. The demonstration may be made specific to the electronic device, for example the frequency at which the device is manipulated through the sequence of orientations in the demonstration will depend on the frequency with which the orientation sensor is polled by the processor (which itself will depend on the frequency with which the clock powers up the processor). The presentation could therefore instruct the user to perform the sequence at a suitably defined rate. In this way, the user is likely to be successful in activating the device my mimicking the actions of the presentation. The user may be provided with a link from which they can view or download the presentation when they purchase the electronic device.

Figure 4:
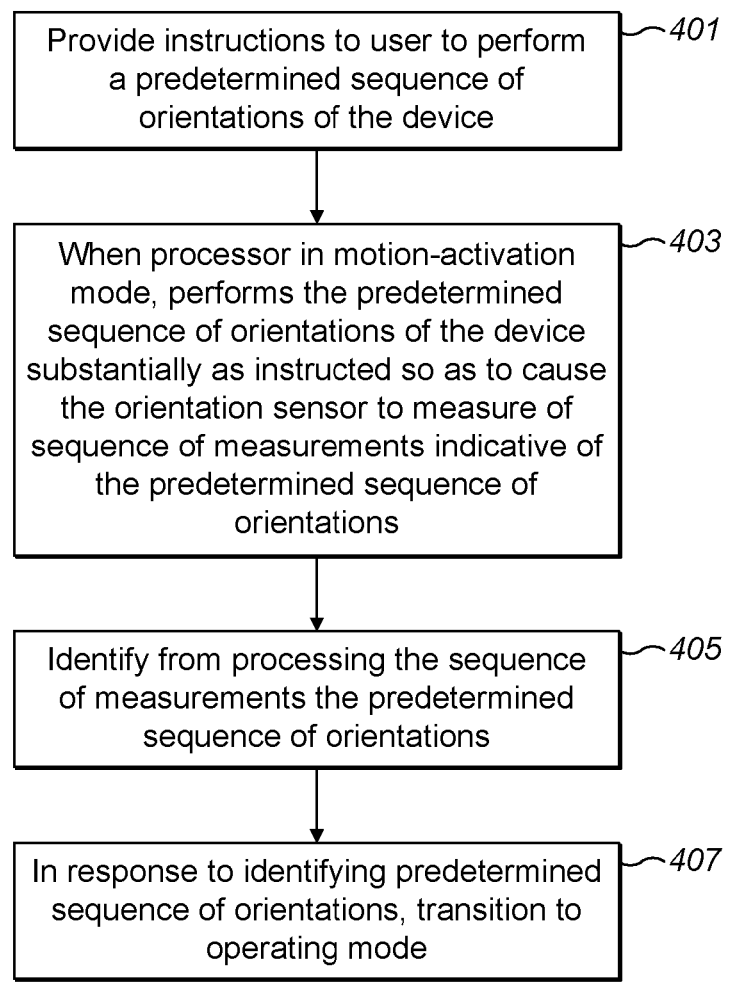
FIG. 4 is a flowchart of steps for enabling a user to manoeuvre a device so as to cause the processor of the device to transition from a motion activation mode to a operating mode.

FIG. 4 shows a flowchart of steps for a method of causing a processor for an electronic device of the type herein described to transition from a motion-activated mode to an operating mode.

At step 401, instructions are provided to a user to perform a predetermined sequence of orientations of the device. The instructions may be provided in the form of a demonstration on a user device, as described above.

Next, when the processor is in the motion-activation mode, a user performs the predetermined sequence of orientations of the device substantially as instructed so as to cause the orientation sensor to measure of sequence of measurements indicative of the predetermined sequence of orientations (step 403).

Because the user has moved the device through the predetermined sequence of orientations at a suitable rate by following the instructions, the processor identifies from processing the periodic series of measurements the predetermined sequence of orientations (step 405) and in response transitions to the operating mode (step 407).

Although in the examples described herein the device processor is activated in response to the device being moved through predetermined sequence of orientations, this is for the purpose of illustration only, and other sequences of movement of the device are within the scope of the present disclosure. For example, the sequence of movements may comprise moving the device along a series of directions, either at a constant speed or under acceleration. Alternatively the sequence of movements may comprise rotating the device about a series of axes.

The orientation sensor could be any suitable sensor for obtaining measurements indicative of movement of the device. The movement sensor could be, for example, a gyroscope, a spirit level, a pitot tube for measuring air speed relative to the device, and so on.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. An electronic device comprising:
   a processor having a motion activation mode and an operating mode;
   an orientation sensor operable to detect an orientation of the device, and
   a clock configured to, when the processor is in the motion activation mode, periodically power-up the processor;
   wherein the processor is configured to, when powered-up in its motion activation mode, obtain a measurement of the orientation of the device from the orientation sensor; store the obtained measurement; and process the obtained measurement in dependence on two or more stored measurements of the orientation of the device so as to determine whether the obtained measurement and the two or more stored measurements are indicative of a predetermined sequence of at least three orientations of the device;
   the processor being configured to transition from its motion activation mode to its operating mode in response to determining that the obtained measurement and the two or more stored measurements are indicative of the predetermined sequence of at least three orientations of the device.

2. An electronic device as claimed in claim 1, wherein the processor is configured to power-down immediately on completing the said processing in response to determining that the obtained measurement and the two or more stored measurements are not indicative of a predetermined sequence of at least three orientations of the device.

3. An electronic device as claimed in claim 1, wherein the clock is configured to cause the processor to power up at a frequency of no more than 2 Hz and preferably no more than 1 Hz.

4. An electronic device as claimed in claim 1, wherein, in its motion-activated mode, the processor is in a low power mode.

5. An electronic device as claimed in claim 1, wherein the processor is configured to process the measurements from the orientation sensor by comparing the obtained measurement and the said two or more stored measurements against a stored sequence of measurements indicative of the predetermined sequence of orientations of the device, the processor identifying said predetermined sequence on determining a match within predefined bounds between the obtained and said two or more stored measurements and the stored sequence of measurements.

6. An electronic device as claimed in claim 1, wherein the predetermined sequence of orientations of the device comprises at least two orientations.

7. An electronic device as claimed in claim 6, wherein the predetermined sequence of orientations of the device comprises three orientations, the first and second orientations of the sequence being different orientations of the device.

8. An electronic device as claimed in claim 6, wherein the first and second orientations differ by approximately one hundred and eighty degrees.

9. An electronic device as claimed in claim 1, wherein the orientation sensor is configured to be substantially powered-down between each measurement of the orientation of the device, when the processor is in its motion-activated mode.

10. An electronic device as claimed in claim 1, wherein the electronic device further comprises a wireless transceiver and the processor is operable to communicate using the wireless transceiver when in its operating mode and to inactivate the transceiver when in its motion-activated mode.

11. An electronic device as claimed in claim 10, wherein the processor is operable to, on entering its operating mode, use the wireless transceiver to communicate messages for establishing a connection with a remote device.

12. An electronic device as claimed in claim 8, wherein the electronic device is further configured to enter its motion-activated mode if no such connection is established within a predetermined time period.

13. An electronic device as claimed in claim 1, wherein the electronic device is adapted for measuring a parameter of its environment, and the device is configured to measure said parameter only when the processor is in its operating mode.

14. An electronic device as claimed in claim 1, wherein the electronic device comprises a power source for powering the electronic device but does not present any means for charging the power source.

15. An electronic device as claimed in claim 1, wherein the electronic device comprises a non-replaceable power source for powering the electronic device.

16. An electronic device as claimed in claim 1, the electronic device being wholly encapsulated within a sealed casing.

17. An electronic device as claimed in claim 1, the electronic device not presenting any input means to a user.

18. A method of activating an electronic device comprising a processor having a motion-activation mode and an operating mode, an orientation sensor operable to detect an orientation of the device, and a clock configured to, when the processor is in motion-activation mode, periodically power up the processor, wherein the processor is configured to, when powered-up in its motion activation mode, obtain a measurement of the orientation of the device from the orientation sensor; store the obtained measurement; and process the obtained measurement in dependence on two or more stored measurements of the orientation of the device so as to determine whether the obtained measurement and the two or more stored measurements are indicative of a predetermined sequence of at least three orientations of the device, the method comprising:
   providing instructions to a user to perform a predetermined sequence of orientations of the device;
   when the processor is in motion-activated mode, performing the predetermined sequence of at least three orientations of the device substantially as instructed;
   the processor obtaining a plurality of measurements of the orientation of the device from the orientation sensor and processing those measurements to identify the performed predetermined sequence of at least three orientations of the device; and
   causing the processor to transition from the motion-activated mode to the operating mode.

19. A method as claimed in claim 18, wherein the instructions instruct the user to perform the sequence at a defined rate.

20. An electronic device as claimed in claim 1, wherein the obtained measurement and the two or more stored measurements are indicative of the device having moved through a predetermined sequence of orientations at a rate commensurate with the timing of the measurements obtained from the orientation sensor.

* * * * *